(12) United States Patent
Kim

(10) Patent No.: US 7,200,209 B1
(45) Date of Patent: Apr. 3, 2007

(54) SYSTEM AND METHOD FOR UNIFYING MULTIPLE CONNECTION PORTS IN A NETWORK

(75) Inventor: Young-Gi Kim, Incheon (KR)

(73) Assignee: LG-Nortel Co., Ltd., Seoul (KR)

( * ) Notice: Subject to any disclaimer, the term of this patent is extended or adjusted under 35 U.S.C. 154(b) by 1520 days.

(21) Appl. No.: 09/695,259

(22) Filed: Oct. 25, 2000

(30) Foreign Application Priority Data

Oct. 26, 1999 (KR) .............................. 1999/46708

(51) Int. Cl.
H04M 1/64 (2006.01)

(52) U.S. Cl. .................................. 379/88.25; 370/428

(58) Field of Classification Search ............... 379/67.1, 379/88.18, 88.22, 88.27, 88.28; 370/351, 370/352, 353, 354, 276; 706/45, 46, 53
See application file for complete search history.

(56) References Cited

U.S. PATENT DOCUMENTS

| | | | | |
|---|---|---|---|---|
| 4,757,525 A | * | 7/1988 | Matthews et al. | 379/88.26 |
| 5,029,199 A | * | 7/1991 | Jones et al. | 379/88.26 |
| 5,684,862 A | * | 11/1997 | Finnigan | 379/88.22 |
| 6,064,653 A | * | 5/2000 | Farris | 370/237 |
| 6,075,844 A | * | 6/2000 | Goldberg et al. | 379/88.17 |
| 6,091,736 A | * | 7/2000 | Hayashi | 370/428 |
| 6,115,455 A | * | 9/2000 | Picard | 379/67.1 |
| 6,181,780 B1 | * | 1/2001 | Finnigan | 379/67.1 |
| 6,215,858 B1 | * | 4/2001 | Bartholomew et al. | 379/88.17 |

* cited by examiner

Primary Examiner—Fan Tsang
Assistant Examiner—Olisa Anwah
(74) Attorney, Agent, or Firm—Ked & Associates, LLP

(57) ABSTRACT

The present invention relates to a voice mail system (VMS), and more particularly, to a system and method for unifying multiple connection ports of a voice mail system. A system according to the present invention includes an external input/output controller (EIOC) provided between a VMS having a plurality of boards that perform the same function and a plurality of external servers. The EIOC is adapted to provide an unified network connection point between the plurality of boards and the plurality of external servers by routing a message transferred from any one of the plurality of boards to any one of the external servers. The EIOC is also configured to route a message transferred from any one of the plurality of external servers to a corresponding board of the VMS. The stability of such a system is increased by making external servers (IP networks) regard the VMS as a single network connection point. In addition, since the EIOC allows external servers to be connected to the VMS, and performs a routing function, it can detect an intrusion of an inaccessible external server, and maintain the security for the VMS.

16 Claims, 8 Drawing Sheets

SYSTEM AND METHOD FOR UNIFYING MULTIPLE CONNECTION PORTS IN A NETWORK

BACKGROUND OF THE INVENTION

1. Field of the Invention

The present invention relates to a voice mail system (VMS), and more particularly, to a system and method for unifying multiple connection ports of a voice mail system.

2. Background of the Related Art

Generally, a voice mail system (VMS) is closely connected to a switching system to thus provide a mail service that processes a user's call information using a number of protocols, such as No. 7, LAPD, R2, MST, etc, in a situation where the user can't answer a telephone call. FIG. 1 is a block diagram of a background art VMS.

As illustrated therein, one VMS 10 includes a plurality of (e.g.,four) main data processing units (MPUD) 11–14, and a main call processing unit (MPUC) 15 for call processing. Each MPUD 11–14 is connected with external servers 21–23 via a network. Each MPUD 11–14 processes data on a corresponding mail service according to input call information.

The external servers may include, for example, a VCS (Voice Compression System) server 21, a NCS (Network Control System) server 22, and/or a SMS (Subscriber Management System) server 23.

Here, the parts marked "a" indicate a network connection point of each MPUD 11–14 in the VMS 10. The parts marked "b" indicate a sender/receiver path between the VMS 10 and the external servers 21–23. The parts marked "c" indicate a network connection point of each external server 21–23.

In a background art system and method, voice files and number call information may be transferred from the VMS 10 to the external servers 21–23 (which is called a forward message transfer). When call information is input from the switching system to the VMS 10 upon the user's radio paging, the corresponding MPUD 11–14 in the VMS 10 transfers the call information to the VCS server 21 via its network connection point, after processing voice file information. In addition, the voice call information, and the number call information may also be transferred to the NCS server 22 via the corresponding network connection point.

In some situations, an overload control message and a mail box management message may be transferred from the external servers 21–23 to the VMS 10 (which is called a backward message transfer). The VCS server 21 may transfer overload information to each individual MPUD 21–23. In this instance, each MPUD 21–23 independently controls the overload of the VCS 21 using the received overload information. In addition, the NCS server 22 may also transfer overload information to each individual MPUD 21–23, and each MPUD 21–23 would then independently control the overload of the NCS server 22.

In other situations, the NCS server 22 may transfer a call result response message to a corresponding MPUD by managing the MPUD corresponding to a call.

In some instances, a mail box information management message (add, delete, modify, inquiry) may be sent by the SMS server 23 to a MPUD corresponding to a particular mailbox. The SMS server 23 would search for the MPUD corresponding to a particular mail box using independently embedded mail box information. The SMS server 22 would then transfer a mail box management message to the corresponding MPUD.

In this way, call information received through the switching system is processed by means of the VMS 10, and processed information is transferred to external servers, such as the VCS server, NCS server, etc., by TCP/IP and/or UDP/IP protocol methods. This allows the VMS 10 to provide various information services to a subscriber.

However, because the MPUC and MPUDs of the background art system have an IP network interface with an external server system, there can be trouble individually managing a module connected with the external servers. In addition, since multiple IP addresses are assigned to one VMS, external network management can be quite complicated. Further, since the MPUDs and MPUC in the VMS must be managed independently, the stability of the system is reduced.

Moreover, since the external server system transfers/receives messages to/from the MPUDs and MPUC of the VMS individually, information in the VMS may be lost, which degrades the safety of the VMS.

Also, because an individual board in the background art VMS is duplexed not as a duplex network at the system level, but according to the active/standby state of each individual board, all the boards must be exchanged even in the case of simple failure in a network module in an individual board.

SUMMARY OF THE INVENTION

An object of the invention is to solve at least the above problems and/or disadvantages and to provide at least the advantages described hereinafter.

Accordingly, it is an object of the present invention to provide a system and method for unifying multiple connection ports in a network wherein, when a plurality of data and call processing boards are constructed as one system, a network interface with the outside is unified.

To achieve the above object, a system for unifying multiple connection ports in a network according to the present invention includes: an external input/output controller (EIOC) provided between a VMS having a plurality of boards performing the same function and a plurality of external servers. The EIOC is adapted to provide an unified network connection point between the plurality of boards and the plurality of external servers by routing a message transferred from the plurality of boards to a corresponding external server and by routing a message transferred from the plurality of servers to a corresponding board.

To achieve the above object, a method for unifying multiple connection ports in a network according to the present invention includes a forward message transfer step of checking the header of a message, when the message is transferred from a VMS having a plurality of MPUDs via multiple connection ports, and transferring the message to a corresponding server according to the destination information of the header. The method may also include a step of performing a backward message transfer, where a message is routed to a corresponding MPUD using routing information when the message is received from one of a plurality of external servers.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

A preferred embodiment of the present invention will be described with reference to the accompanying drawings.

Figure 1:
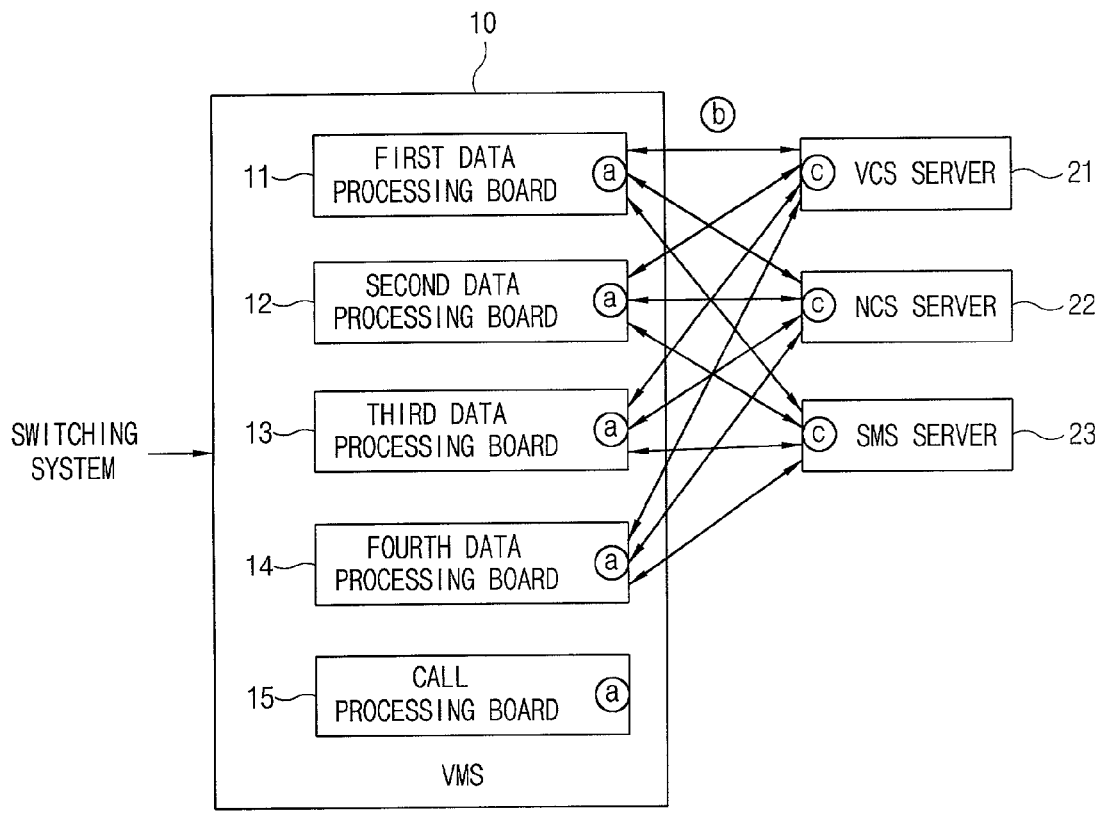
FIG. 1 is a block diagram illustrating an example of a VMS having multiple connection network points according to the background art.
Figure 2:
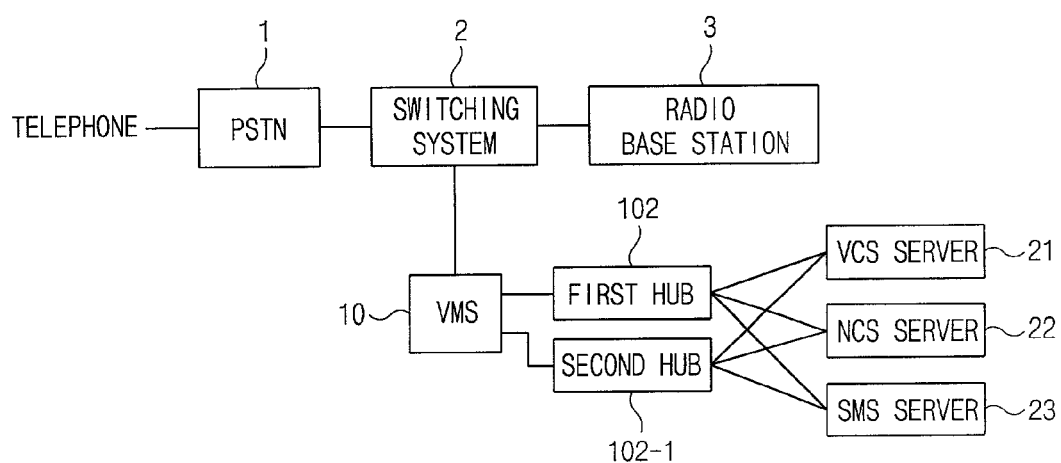
FIG. 2 is a diagram of a VMS, a switching system, and external servers according to the present invention.

FIG. 2 is a diagram of a network between a VMS and external servers according to the present invention. As illustrated therein, the VMS 10 includes an EIOC (External Input/Output Controller) for recognizing multiple network connection points as a single network connection point. This allows each of a plurality of external servers 21 through 23 to perform a message transfer and reception to/from the VMS 10 via the single network connection point. In this system, a first hub 102 and a second hub 102-1 are arranged in a duplex structure.

Figure 3:
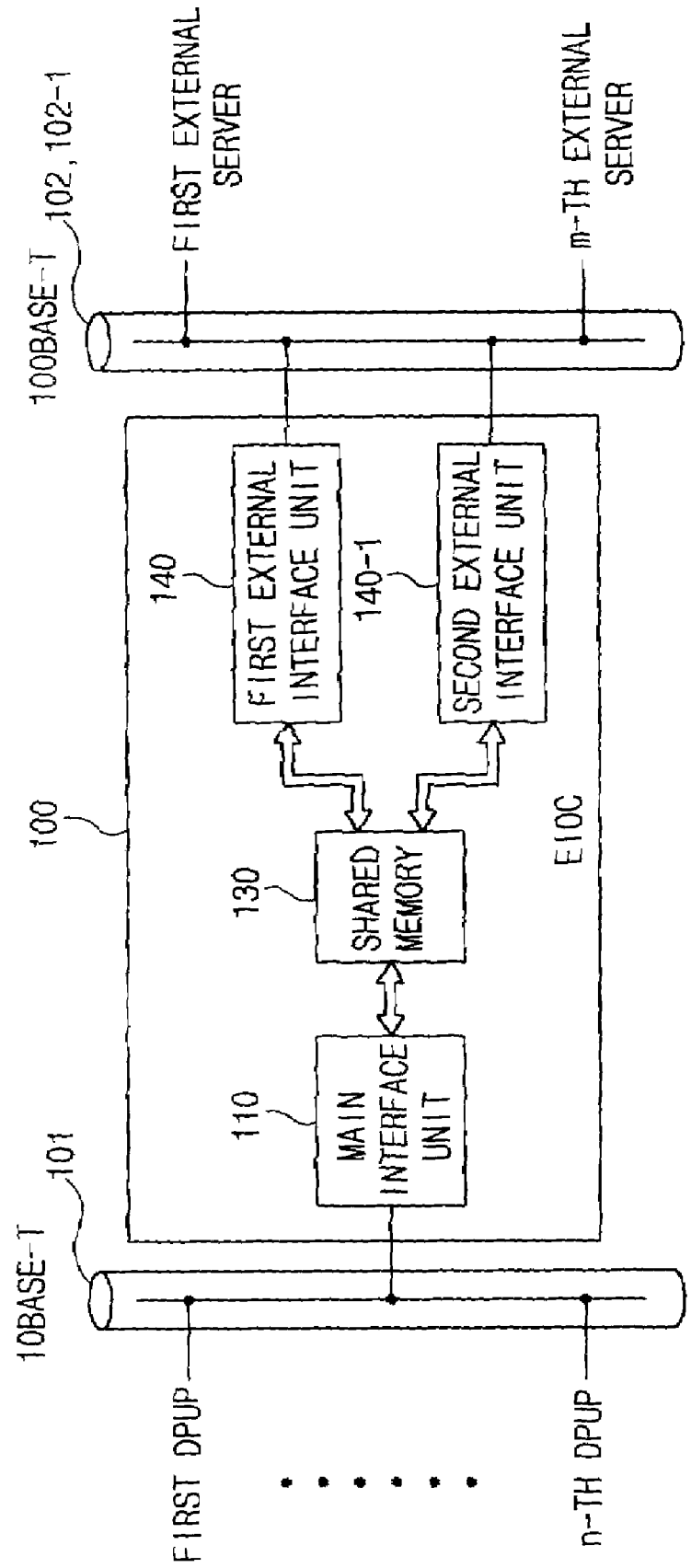
FIG. 3 is a block diagram of a system for unifying multiple connection ports of a VMS according to the present invention.

FIG. 3 is a block diagram of a system for unifying multiple connection ports in a network according to the present invention.

An EIOC 100 is positioned between a plurality of data and/or call processing boards (DPUP) and a plurality of external servers. The EIOC 100 routes a message transferred from one of the plurality of DPUPs, to the corresponding external server, and routes a message transferred from one of the plurality of external servers to the corresponding DPUP. In FIG. 3, the EIOC 100 is connected with the plurality of DPUPs by a 10 BASE-T connection 101, and is connected with the plurality of external servers by a 100 BASE-T connection 102 and 102-1. Of course, other types of connections could also be used without departing from the spirit and scope of the invention.

The EIOC 100 may include a main interface unit 110 designed to interface with a plurality of data and/or call processing boards of a VMS. The EIOC 100 may also include a duplex external interface unit 140 and 140-1 configured to interface with the plurality of external servers. A shared memory 130 for message transfer and reception between the main interface unit 110 and the external interface units 140 and 140-1 may also be provided.

Figure 4:
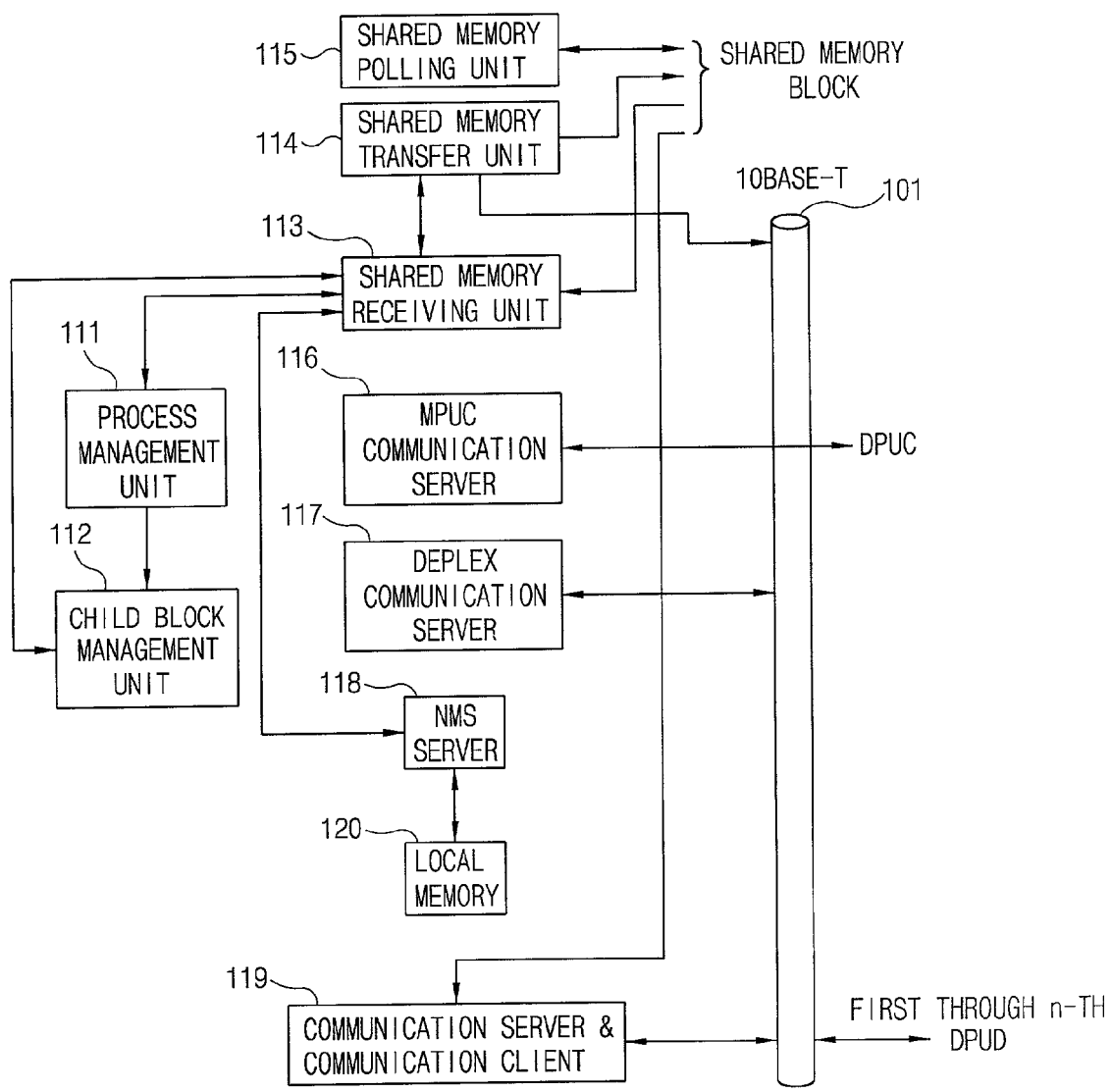
FIG. 4 is a block diagram of a main interface unit of an EIOC according to the present invention.

As illustrated in FIG. 4, the main interface unit 110 may include a process management unit 111 for generating and monitoring all processes using a most significant process, and for controlling the overall operation of the main interface unit 110. A child block management unit 112 may be provided for driving a child process, to thus transfer and receive an operational message and state information based on control signals generated by the process management unit 111. A shared memory polling unit 115 may be provided to periodically poll the shared memory 130, to thus read or write a corresponding message. A shared memory receiving unit 113 may be provided to analyze a message read out from the shared memory 130 according to polling by the shared memory polling unit 115. A message could then be routed to a corresponding board in a VMS according to the result of the analysis. A shared memory transfer unit 114 would be used to transfer a message from one of the plurality of data and call processing boards to the shared memory 130, and to generate an interrupt. A MPUC communication server 116 directly connected with a MPUC 15 is used to obtain mail box information. A duplex communication server 117 is used for controlling the duplexing operation of a duplexed external interface unit 140 and 140-1. A NMS server 118 is used for processing an internal operational message and for collecting state information. A communication server and communication client 119 is used for performing TCP/IP communication with the data and call processing boards. A local memory 120 connected to the NMS server 118 may also be provided.

Thus, the main interface unit 110 may have 9 static processes, a plurality of dynamic processes, four global memories, and a plurality of local memories. The main interface unit 110 performs the functions of message transfer and reception to/from the external interface units 140 and 140-1 via the shared memory 130. The main interface unit also performs message transfer and reception between internal processes using a message queue, and message transfer and reception between a communication process (communication client and client server) and the plurality of data and call processing boards using TCP/IP.

The shared memory 130 is a memory for temporarially storing a message for transfer between the main interface unit 110 and the external interface units 140 and 140-1. The shared memory 130 could include a receiving descriptor and a receiving buffer. The following table describes one example.

TABLE

| DATA NAME | DATA TYPE | NOTE |
|---|---|---|
| SHARED MEMORY STRUCT | SM_VALID (4) | Shared Memory VALID Check Byte |
| | MAIN_RX_FOR_EXT0_IDX (4) | MAIN RX INDEX FOR FIRST EXTERNAL INTERFACE UNIT |
| | MAIN_RX_FOR_EXT1_IDX (4) | MAIN RX INDEX FOR SECOND EXTERNAL INTERFACE UNIT |
| | EXT0_RX_FOR_MAIN_IDX (4) | EXT0 RX INDEX FOR MAIN INTERFACE UNIT |
| | EXT1_RX_FOR_MAIN_IDX (4) | EXT1 RX INDEX FOR MAIN INTERFACE UNIT |
| | MAIN_TX_FOR_EXT0_IDX (4) | MAIN TX INDEX FOR FIRST EXTERNAL |

TABLE-continued

| DATA NAME | DATA TYPE | NOTE |
|---|---|---|
| MAIN_TX_FOR_EXT1_IDX (4) | | INTERFACE UNIT MAIN TX INDEX FOR SECOND EXTERNAL INTERFACE UNIT |
| EXT0_TX_FOR_EXT0_IDX (4) | | EXT0 TX INDEX FOR MAIN INTERFACE UNIT |
| EXT1_TX_FOR_EXT1_IDX (4) | | EXT1 TX INDEX FOR MAIN INTERFACE UNIT |
| RESERVED (4096*4) | | RESERVED FOR FUTURE |
| MAIN_SMINTERFACE_FOR_EXT0 | | DESCRIPTOR AND BUFFER |
| MAIN_SMINTERFACE_FOR_EXT1 | | DESCRIPTOR AND BUFFER |
| EXT0_SMINTERFACE_FOR_MAIN | | DESCRIPTOR AND BUFFER |
| EXT1_SMINTERFACE_FOR_MAIN | | DESCRIPTOR AND BUFFER |
| FILE BUFFER FOR MPUD0 | | FILE BUFFER FOR FIRST MPUD |
| FILE BUFFER FOR MPUD1 | | FILE BUFFER FOR SECOND MPUD |
| FILE BUFFER FOR MPUD2 | | FILE BUFFER FOR THIRD MPUD |
| FILE BUFFER FOR MPUD3 | | FILE BUFFER FOR FOURTH MPUD |

Figure 5:
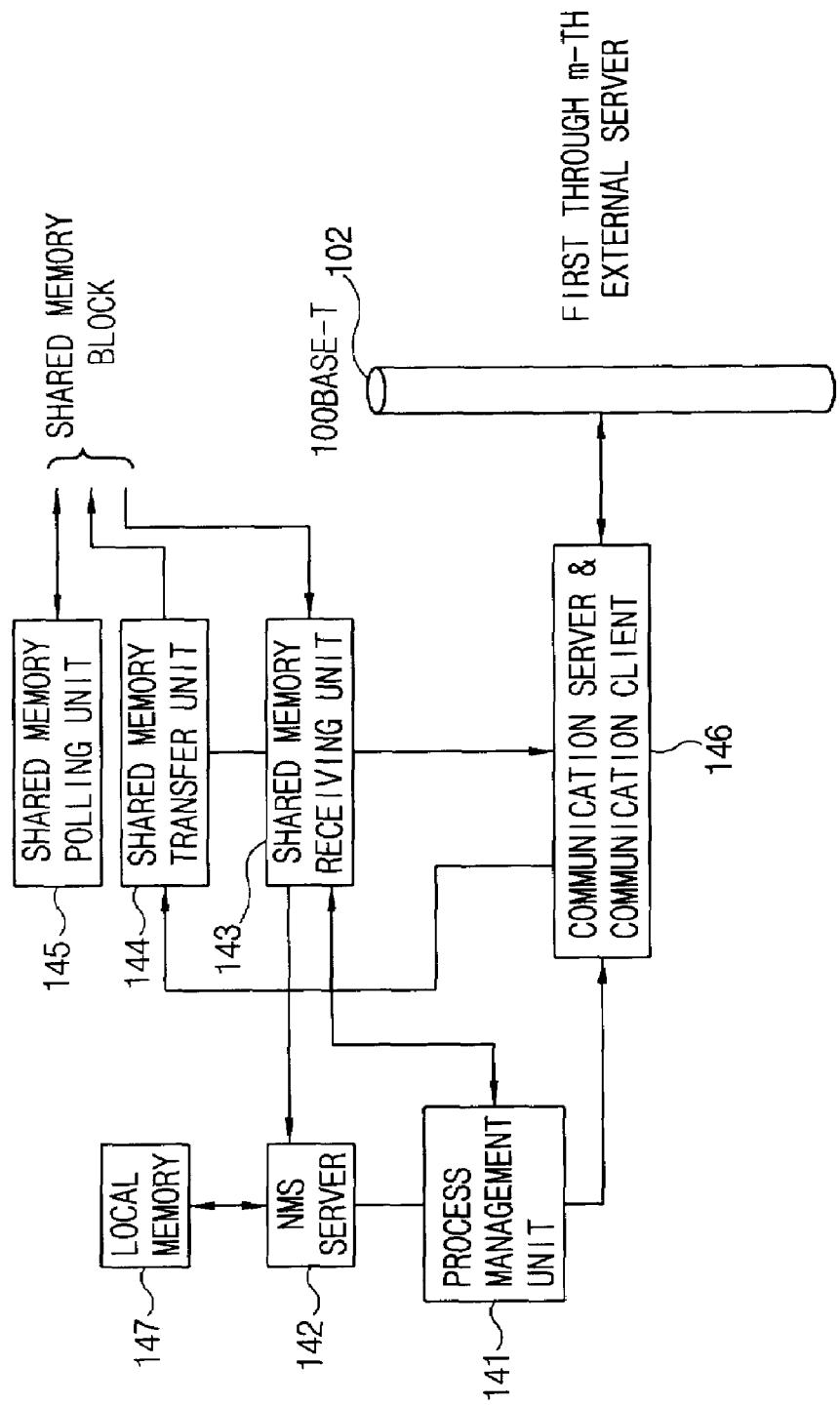
FIG. 5 is a block diagram of an external interface unit of the EIOC according to the present invention.

In addition, as illustrated in FIG. 5, the external interface units 140 and 140-1 may include a process management unit 141 for generating and monitoring all processes using a most significant process, and for controlling the overall operation of the external interface unit 140. A shared memory polling unit 145 may be provided to periodically poll the shared memory 130, to thus read or write a corresponding message. A shared memory receiving unit 143 may be provided to analyze a message read out from the shared memory 130 according to the polling of the shared memory polling unit 145. The shared memory receiving unit 143 could then route a message on to one of the plurality of external servers according to the result of the analysis. A shared memory transfer unit 144 may be provided for transferring a message coming from one of the plurality of external servers to the shared memory 130 and for generating an interrupt. A communication server and communication client 146 may be provided for performing TCP/IP communication with the external servers. Of course, other communications schemes and file transfer protocols could also be used to communicate with an external server. A local memory 147 may also be provided.

The external interface units 140 and 140-1 have four basic processes, a plurality of run-time generation processes, and three local memories. The external interface units perform the functions of message transfer between the shared memory 130, the shared memory polling unit 145, the shared memory transfer unit 144, and the shared memory receiving unit 143. The external interface units also provide network TCP/IP communication with the external servers.

Figure 6:
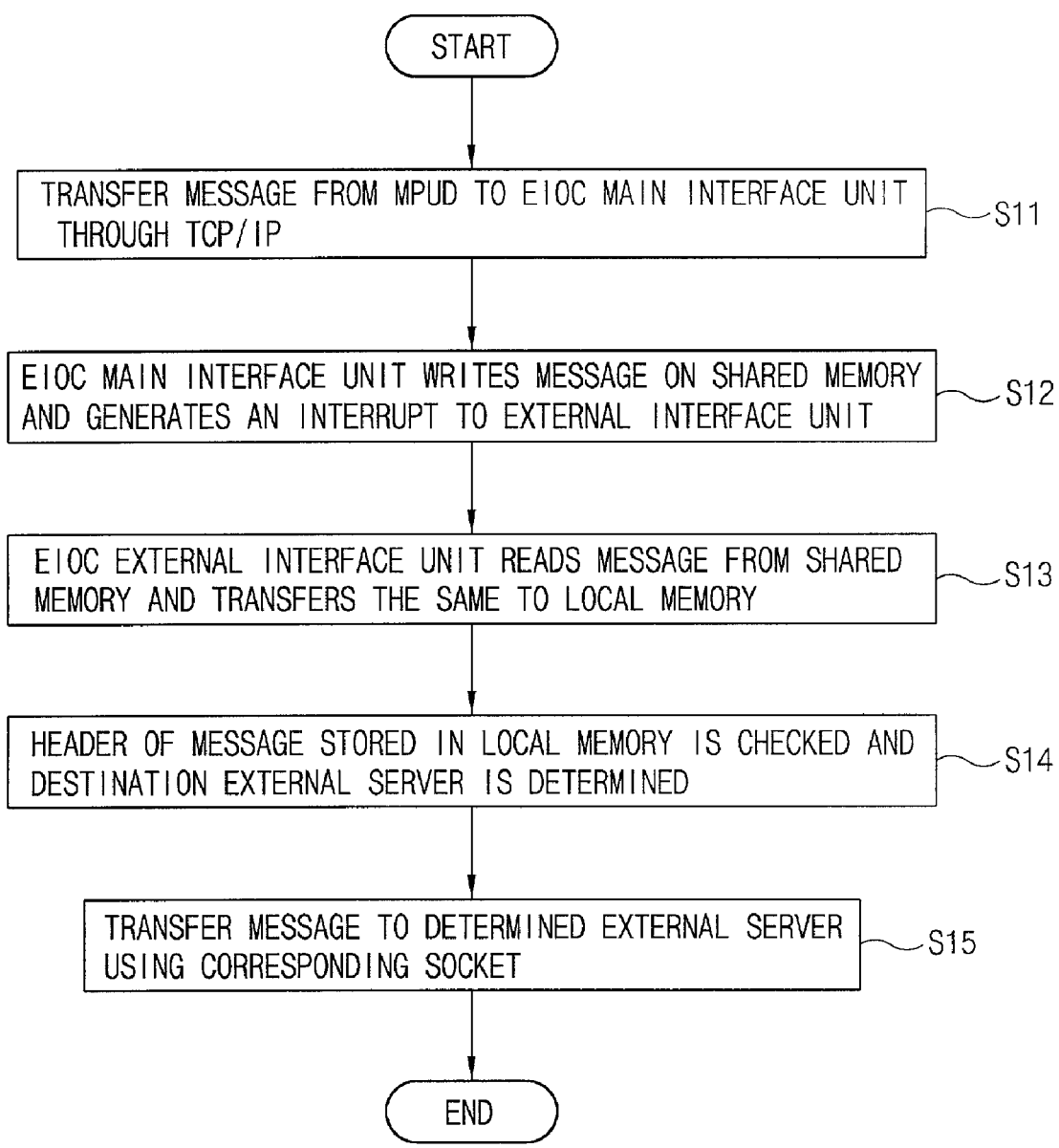
FIG. 6 is a flow chart illustrating a method for transferring a message to a corresponding external server using a single network connection point in the VMS according to the present invention.

A network interfacing method for unifying multiple connection ports in a network according to the present invention will be described with reference to the accompanying drawings. FIG. 6 is a flow chart illustrating a method for transferring a message from a VMS to external servers. As illustrated therein, when a message is transferred from a VMS having a plurality of MPUDs, the header of the message is checked, and the message is transferred to the corresponding external server according to the destination information of the header.

Figure 7:
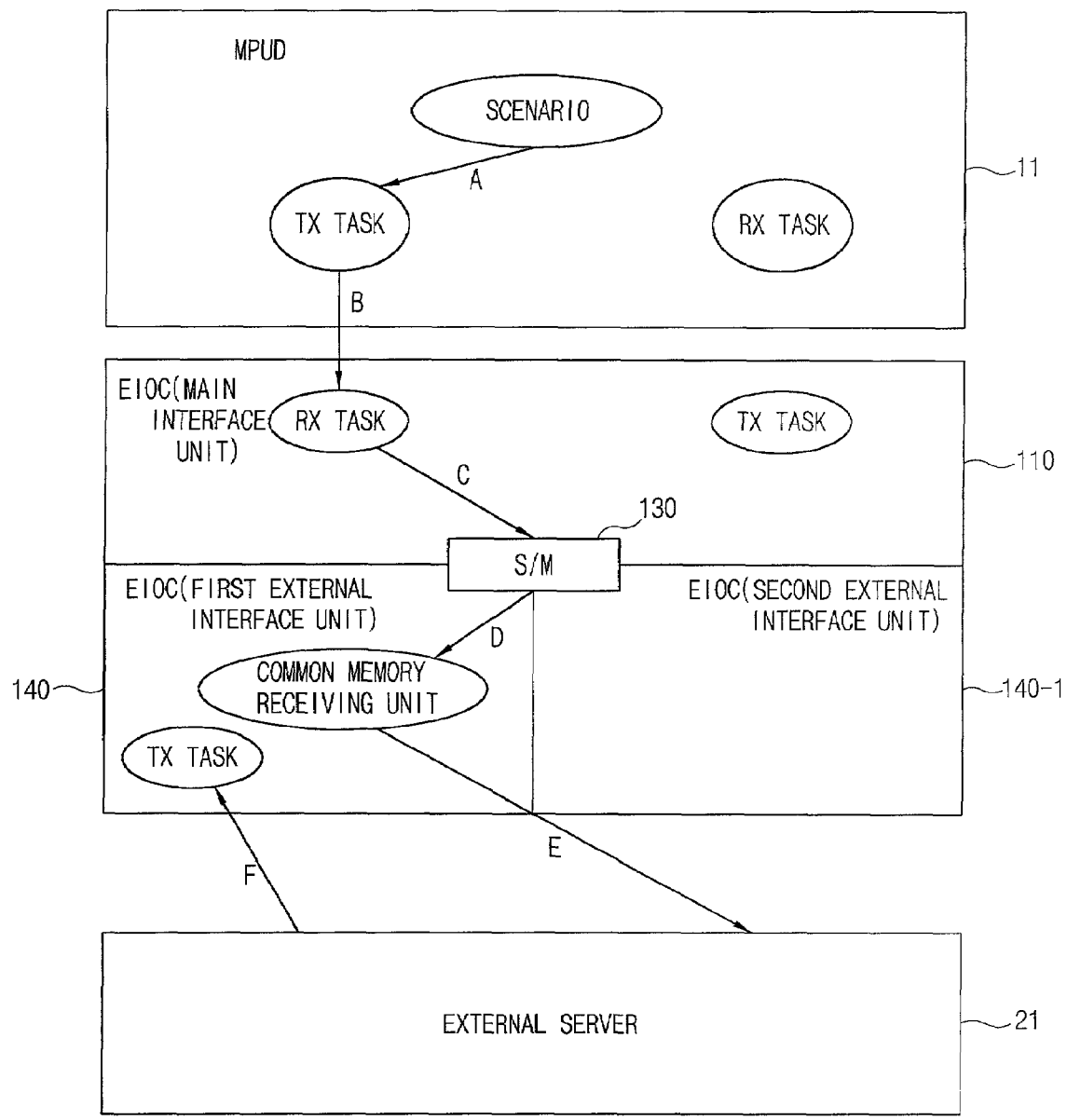
FIG. 7 is a flow chart of a forward message transfer according to the present invention.

More specifically, and with reference to FIG. 7, in step S11, a MPUD calls a message transfer application program interface (API) process (A). The called transfer process transfers a TCP/IP message to the connected main interface unit 110 of the EIOC 100.

In step S12, a receiving task of the main interface unit 110 records a received TCP/IP message in the shared memory 130, and generates an interrupt signal. In step S13, the shared memory receiving unit 143 of the external interface unit 140 detecting this interrupt reads the corresponding message from the shared memory 130, and stores it in the local memory 147. In step S14, the header of the message stored in the local memory 147 is checked to determine the destination external server. Then, in step S15, the message is transferred to the corresponding external server using a socket of a transfer task corresponding to the result of the checking step (S14).

In addition, in step S12, when transferring a file from an MPUD of the VMS 10 to an external server, the file may be divided into a number of packets during the transfer to the main interface unit 110 of the EIOC 100. In this instance, when data packets of a message are first received by the main interface unit 110, the data packets are temporarily stored in the local memory 120 until a complete message file is received. The entire message file is then copied to the shared memory 130. The main interface unit 110 then informs the external interface unit 140 of the presence of the received message by generating an interrupt.

In step S13, when the external interface unit 140 detects the interrupt, it reads the file from the shared memory 130 and copies the same to the local memory 147. The external interface unit 140 may then transfer a response message to the main interface unit 110.

In some embodiments of the invention, the main interface unit 110 may be configured to check the state of the destination server when a message is received from an MPUD. The main interface unit 110 may then store the received message in a corresponding region of the shared memory so that the message is transferred to the next available external interface unit among the duplex external interface units. The main interface unit would then generate an interrupt via an external channel.

The external interface unit detecting the interrupt may be configured to check the socket of the destination external server to determine whether it has an error. If there is no detected error, the external interface unit will transfer the message to the destination server using the corresponding socket. The destination server may then transfer a return message to the external interface unit to acknowledge receipt of the message.

An MPUD of the VMS 10 may transfer a message or file to the NCS server 22, where the transferred message contains number call information, and the message is transferred in the same way that it would be transferred to the VCS server 21. In addition, the VMS 10 may transfer a message to the SMS server 23 in the same way as the VCS server 21.

Figure 8:
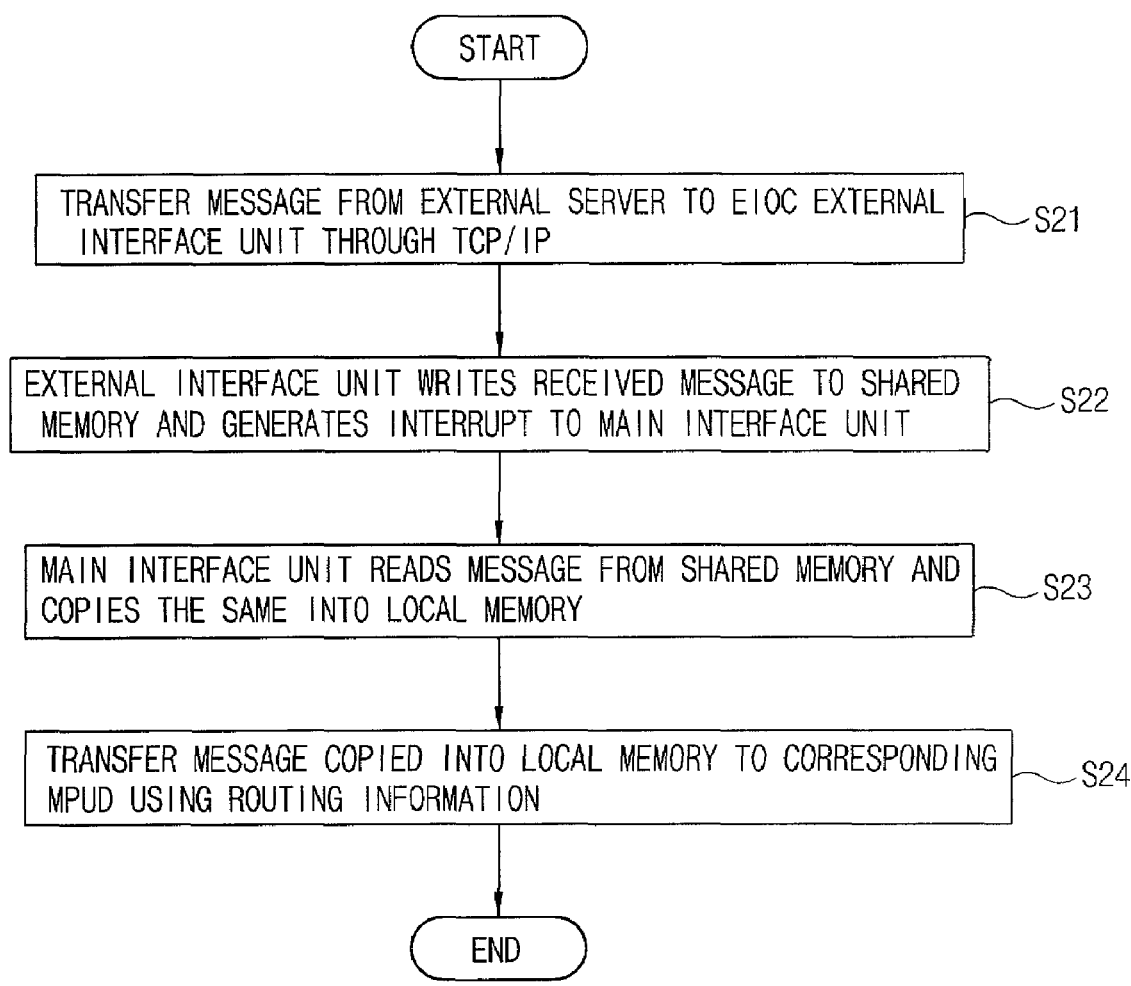
FIG. 8 is a flow chart illustrating a method for transferring a message to a corresponding board in the VMS from one of a plurality of external servers using a single network connection point according to the present invention.

FIG. 8 is a flow chart illustrating a method for network interfacing a message from an external server to the VMS 10. As illustrated therein, when the EIOC 100 receives a message from one of a plurality of external servers, it routes the received message to a corresponding MPUD using routing information embedded in the message. Thus, the external servers can access each of the plurality of MPUDs and the MPUC not as multiple connection ports, but through one connection port.

Figure 9:
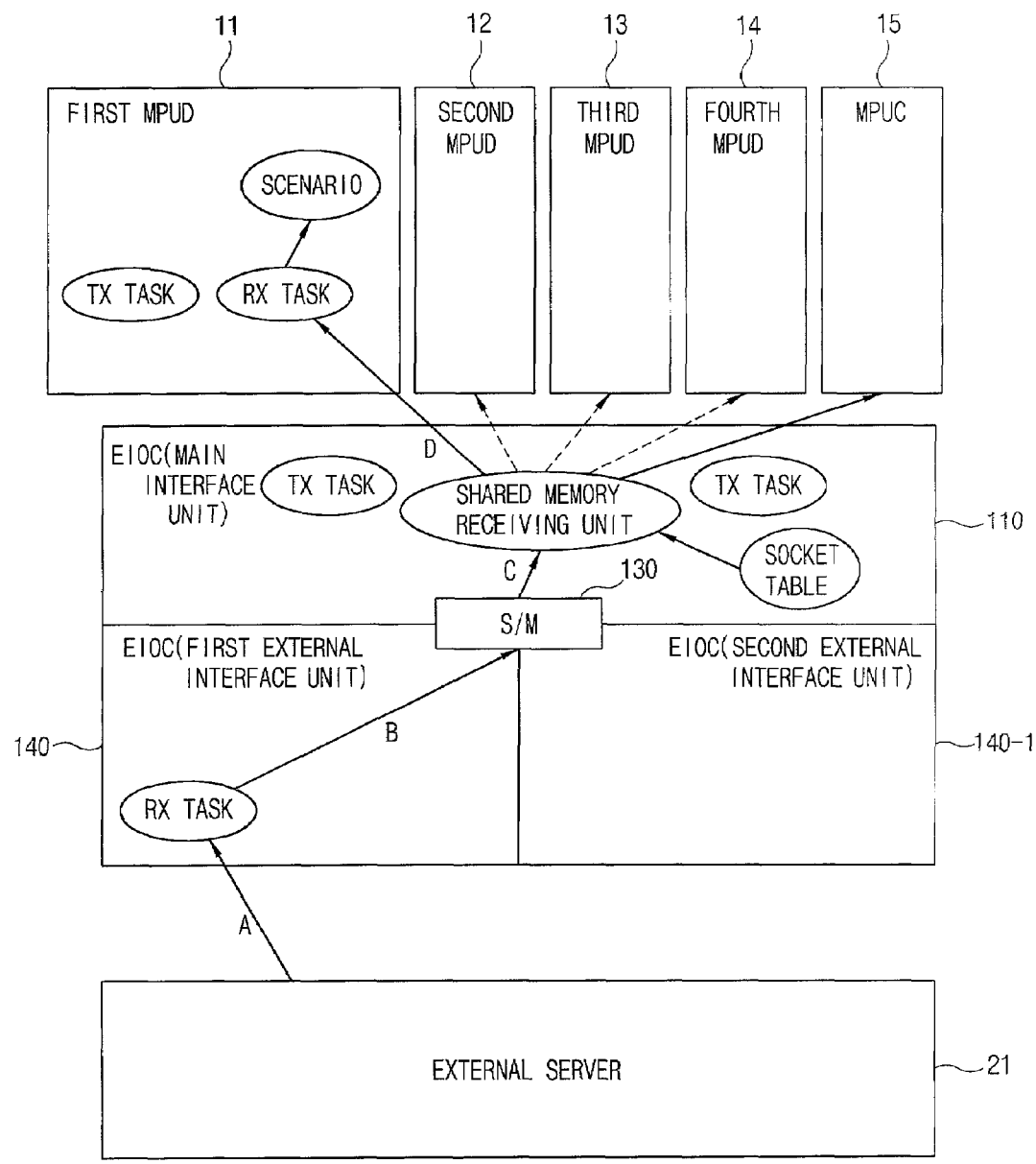
FIG. 9 is a flow chart of a backward message transfer according to the present invention.

More specifically, and as illustrated in FIG. 9, in step S21, the external interface unit 140 of the EIOC 100 receives a message from an arbitrary external server by means of TCP/IP. Of course, other file transfer protocols could also be used. In step S22, the external interface unit 140 records the received message in the shared memory 130, and generates an interrupt to the main interface unit 110 of the EIOC 100.

In step S23, the main interface unit 110, detecting the interrupt, reads the message from the shared memory 130, and stores the same in the local memory. In step S24, the main interface unit then routes the message to a destination board of the VMS with reference to an embedded socket table.

If the message stored in the local memory is an overload-related message, it is transferred according to overload information, or a broadcasting transfer is performed. If the message stored in the local memory is a response message, it is routed to the corresponding MPUD with reference to the message header. If the message stored in the local message is a message added or deleted to/from a mail box, it is routed to a MPUC 15 dealing with call processing. Other messages are routed to the corresponding MPUD using mail box information.

Accordingly, the external servers perform a message transfer by recognizing the MPUC and plurality of MPUDs in the VMS not as a plurality of individual network connection points, but as a single network connection point, by means of the EIOC.

As described above, in the system and method for unifying multiple connection ports in a network according to the present invention, network modules of the VMS are unified and the stability is increased by making external servers (IP networks) regard the VMS as a single network connection point. In addition, the IP network connection with the outside is made convenient.

In addition, since the EIOC is constructed as a duplex structure, and the external interface unit in the EIOC is also constructed as a duplex structure, the network is quadruplexed for thereby increasing the system stability.

In addition, since the EIOC allows external servers to be connected to the VMS, and performs a routing function, it can detect an intrusion of an inaccessible external server, and maintain the security for the VMS.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. In a network having a VMS with a plurality of data and voice processing boards performing the same function and a plurality of external servers, a system for unifying multiple connection ports, comprising:
an external input/output controller (EIOC) configured to provide unified network connection point between the plurality of boards and the plurality of external servers by routing messages from any one of the plurality of boards to any one of the external servers and by routing messages from any one of the plurality of servers to any one of the plurality of boards,
wherein the EIOC checks a header of a message when the message is transferred from one of the plurality of boards of the VMS to the EIOC or from one of the external servers to the EIOC, to determine the destination address of the message, and
wherein the EIOC comprises a main interface unit configured to connect with the plurality of boards, an external interface unit configured to connect with the plurality of external servers, and a shared memory which is configured so that messages can be exchanged between the main interface unit and the external interface unit through the shared memory, the main interface unit comprising:
a communication server and communication client configured to communicate with the plurality of boards;
a shared memory transfer unit configured to transfer a message from one of the plurality of boards to the shared memory, and to generate an interrupt signal to inform the external interface unit that a message is stored in the shared memory; and
a shared memory polling unit configured to periodically poll the shared memory to determine if a message is waiting to be sent or delivered.

2. The system according to claim 1, wherein the main interface unit further comprises a shared memory receiving unit configured to analyze a message read from the shared memory, and configured to route the message to one of the plurality of boards of the VMS based on the results of the analysis.

3. The system according to claim 2, wherein the main interface unit further comprises:
a process management unit configured to generate and monitor all processes performed by the main interface unit; and
a child block management unit configured to drive a child process to transfer and receive an operation message and state information under the control of the process management unit.

4. The system according to claim 3, wherein the external interface unit comprises first and second external interface units, each of which is configured to connect to all of the plurality of external servers, and wherein the main interface unit further comprises:
a duplex communication server configured to control a duplex operation of the first and second external interface units; and
a NMS server configured to process an internal operation message and to collect state information.

5. The system according to claim 1, wherein the external interface unit comprises:
a shared memory polling unit configured to periodically poll the shared memory to determine if a message is waiting to be sent or delivered;
a shared memory receiving unit configured to analyze a message read from the shared memory, and configured to deliver a message to one of the plurality of external servers based on the results of the analysis.

6. The system according to claim 5, wherein the external interface unit further comprises:
a communication server and communication client configured to communicate with the plurality of external servers; and
a shared memory transfer unit configured to transfer a message from one of the external servers to the shared memory, and configured to generate an interrupt to inform the main interface unit that a message is stored in the shared memory.

7. The system according to claim 6, wherein the external interface unit further comprises a process management unit configured to generate and monitor all processes performed by the external interface unit.

8. The system according to claim 1, wherein the main interface unit and the external interface unit inform each other that there is a message to be delivered by generating an interrupt after storing the message in the shared memory, and wherein the main interface unit and the external interface unit recognize that there is a message to be delivered if they receive an interrupt.

9. A method of unifying multiple connection ports in a network that includes a VMS having a plurality of data and call processing boards, and a plurality of external servers, comprising:
 a forward message transfer comprising:
  receiving a message from one of the boards of the VMS in a main interface unit of an external input/output controller (EIOC);
  recording the message in a shared memory of the EIOC;
  generating an interrupt with the main interface unit to inform an external interface unit of the EIOC that a message is stored in the shared memory;
  detecting the interrupt with the external interface unit;
  reading the message from the shared memory with the external interface unit;
  checking a header of the message with the EIOC to determine the destination address of the message, and
  transferring the message from the external interface unit to one of the plurality of external servers based on the determined destination address; and
 a backward message transfer comprising:
  checking the header of a message with the external input/output controller (EIOC), when the message is transferred from one of the external servers to the EIOC, to determine the destination address of the message, and
  transferring the message to one of the plurality of boards of the VMS based on the determined destination address.

10. The method according to claim 9, wherein in the receiving, the board transferring the message also adds an internal message header to the message so that the message can be routed to a desired destination external server.

11. The method according to claim 9, wherein the board transfers a message file to the EIOC by dividing the message into a plurality of data packets.

12. The method according to claim 11, wherein when a message is transferred as a plurality of data packets, the data packets are temporarily stored in a local memory unit of the main interface unit until the entire message is received, and wherein the entire message is then copied to the shared memory.

13. The method according to claim 9, wherein the recording comprises checking a network state and storing the message in a region of the shared memory so that it is transferred to the next available external interface unit of a duplex external interface unit.

14. The method according to claim 9, wherein the reading comprises copying a file from the shared memory into a local memory of the external interface unit, and then transferring a response to the main interface unit.

15. The method according to claim 9, wherein the backward message transfer comprises:
 receiving a message from one of the external servers with an external interface unit of the EIOC;
 storing the received message in a shared memory of the EIOC;
 generating an interrupt with the external interface unit to inform a main interface unit that the message is stored in the shared memory;
 detecting the interrupt with the main interface unit;
 reading the message from the shared memory with the main interface unit; and
 routing the message to one of the plurality of boards of the VMS based on destination information stored in the message.

16. The method according to claim 15, wherein the reading comprises storing the message read from the shared memory in a local memory of the main interface unit, and wherein the routing comprises:
 if the message stored in the local memory is an overload-related message, transferring the message according to an overload information or broadcast transferring the message;
 if the message is a response message, routing the message to a corresponding board of the VMS based on destination information stored in the message;
 if the message is a message added or deleted to/from a mail box, routing the message to a call processing board of the VMS; and
 if the message is some other type of message, routing the message to a corresponding board of the VMS using a mail box information stored in the message.

* * * * *